H. HARDGRAVE.
FLYING MACHINE.
APPLICATION FILED NOV. 17, 1910.
1,039,679.
Patented Sept. 24, 1912.
7 SHEETS—SHEET 6.
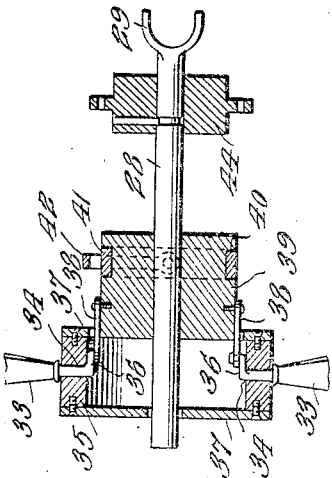
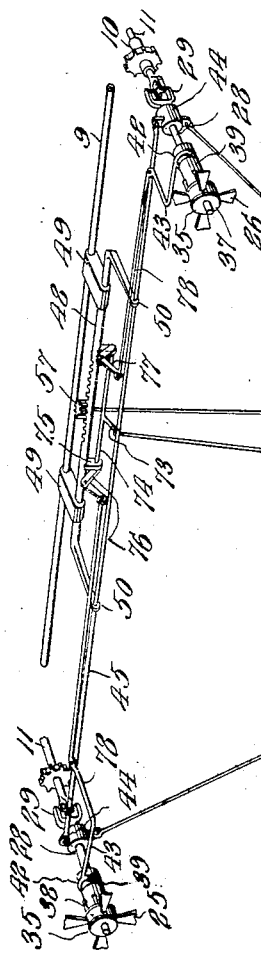
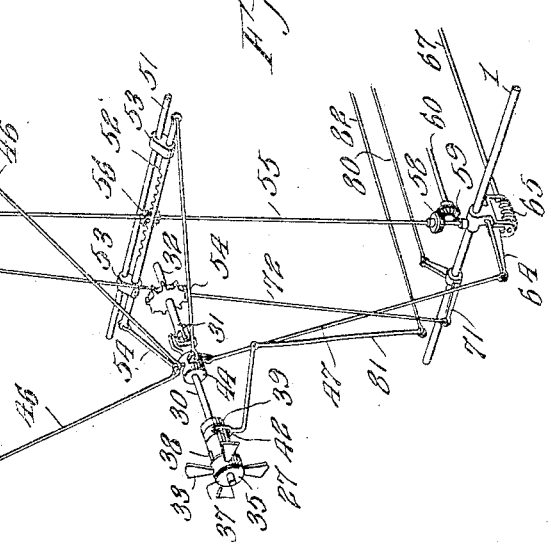
Inventor
Harry Hardgrave,
By Victor J. Evans
Attorney
Witnesses
Frank Hough

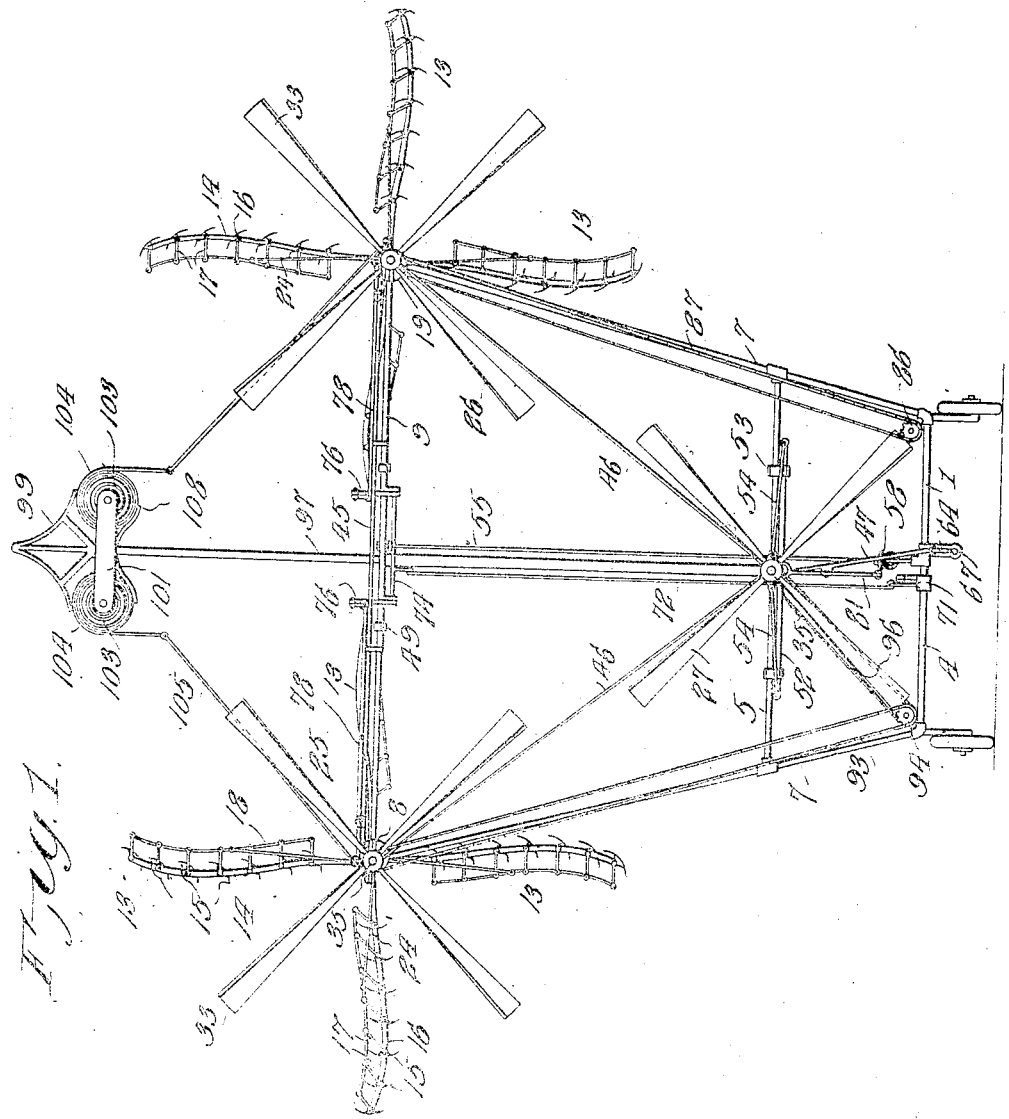

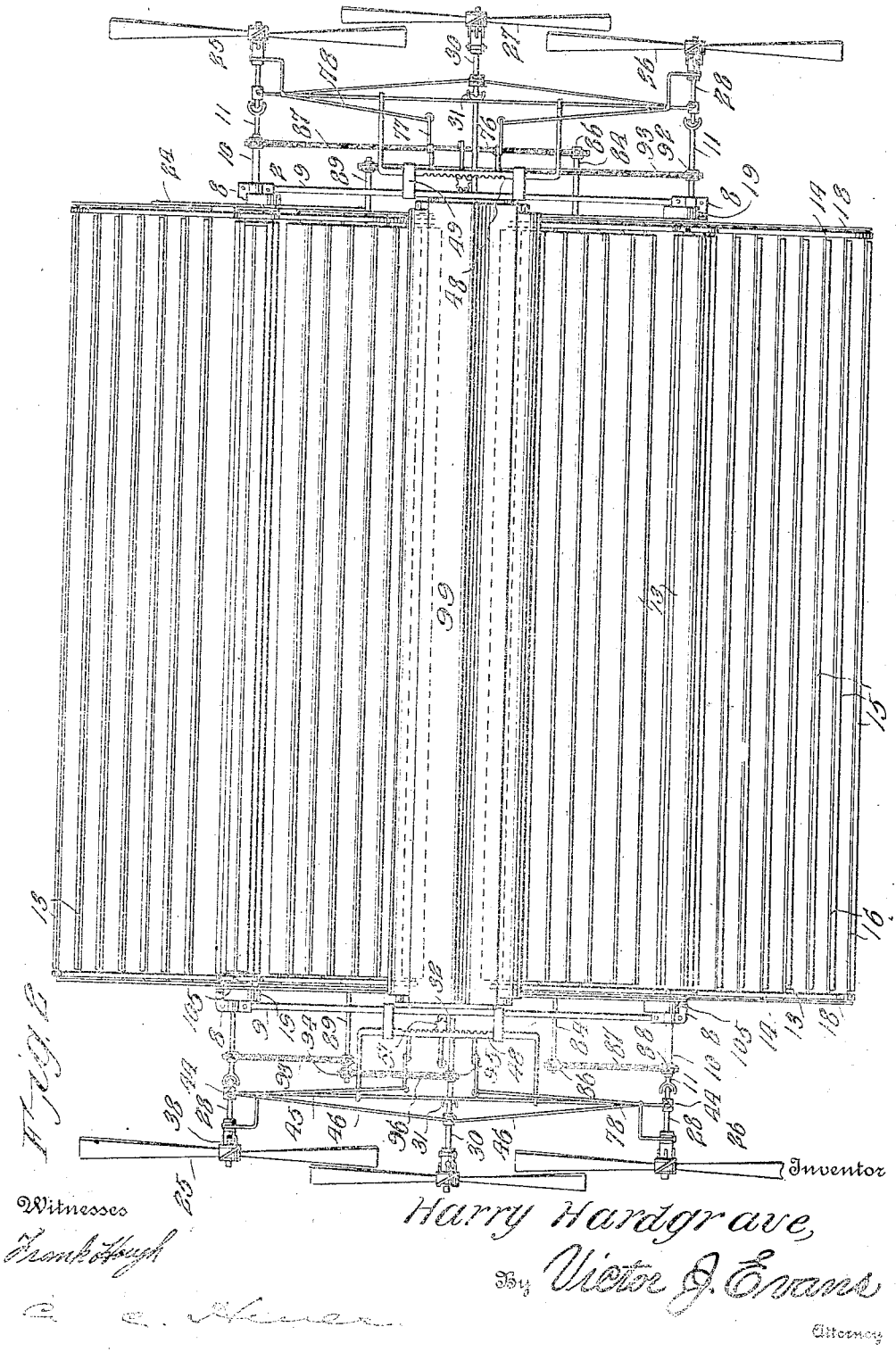

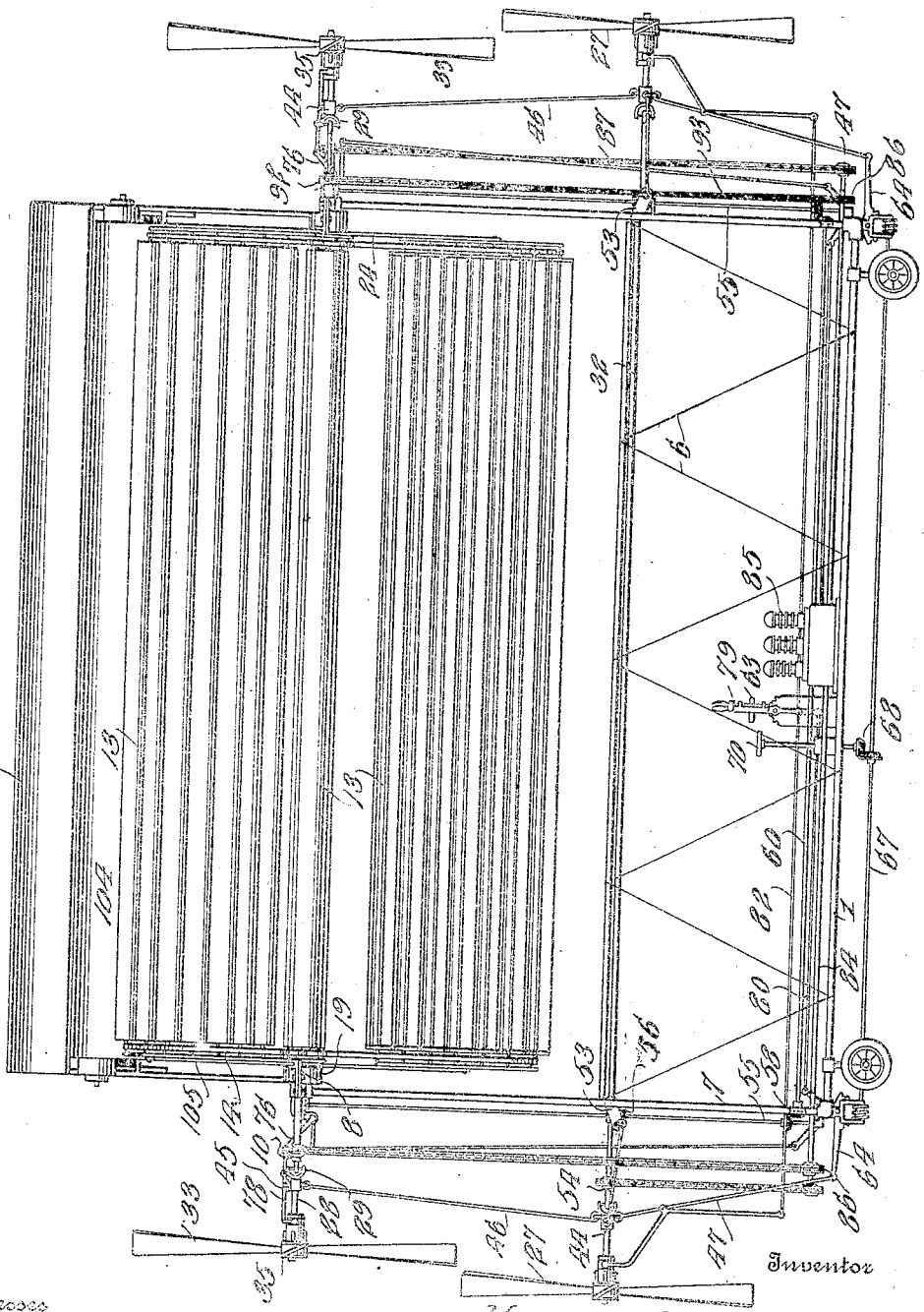

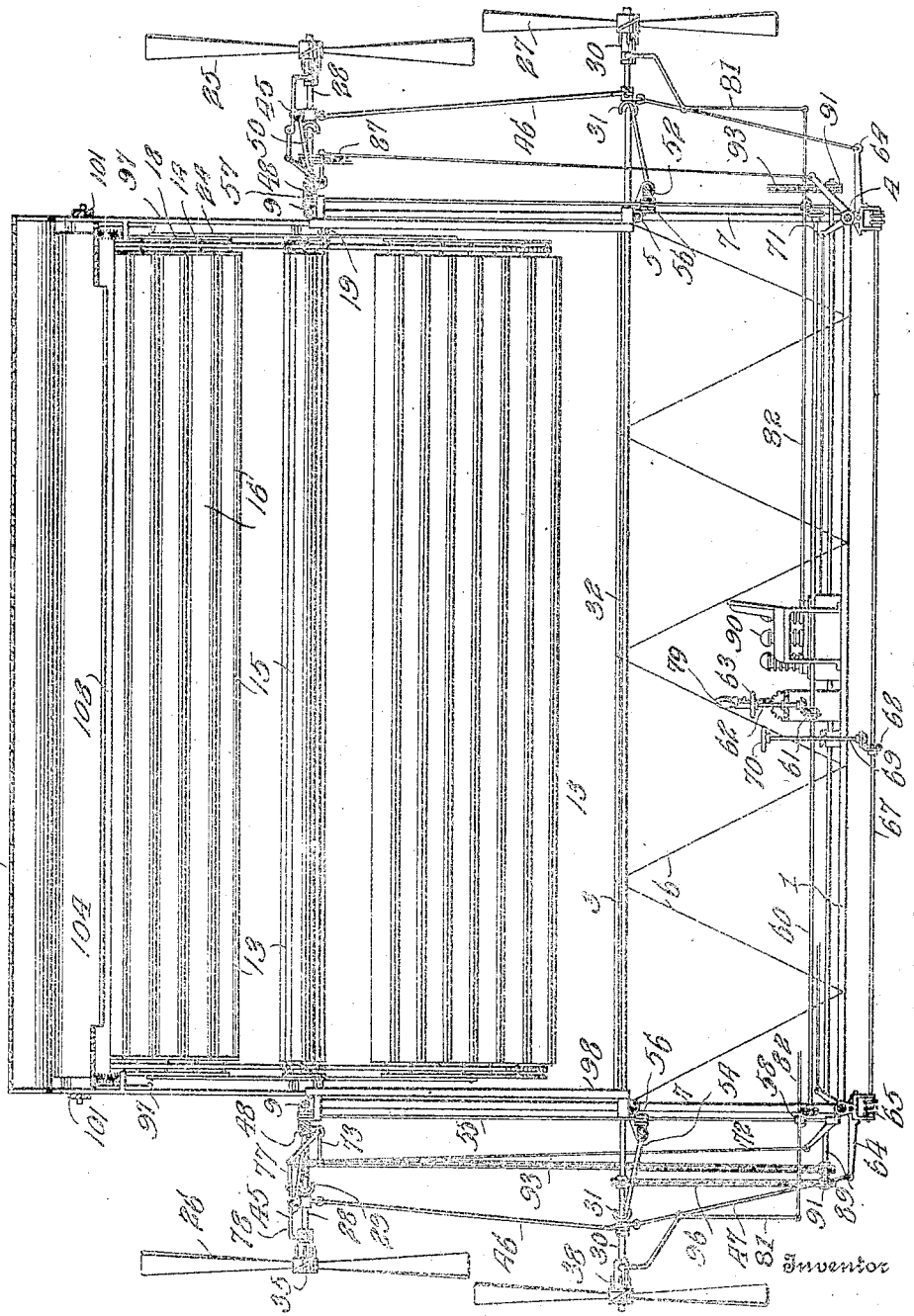

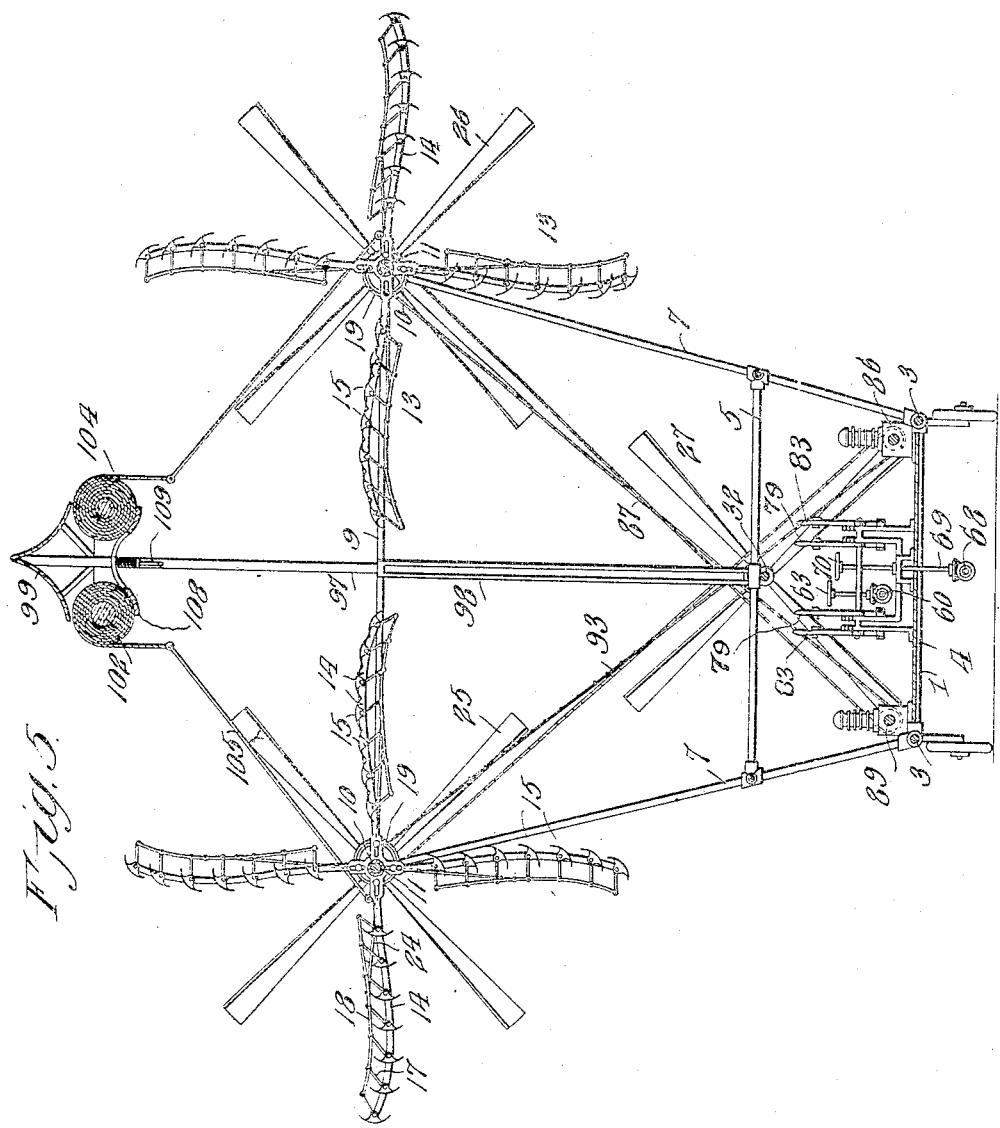

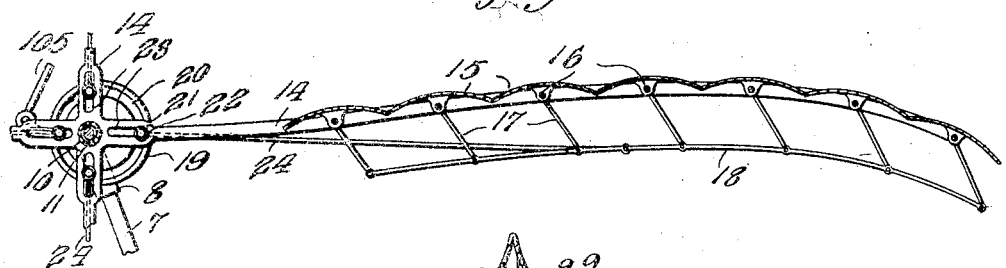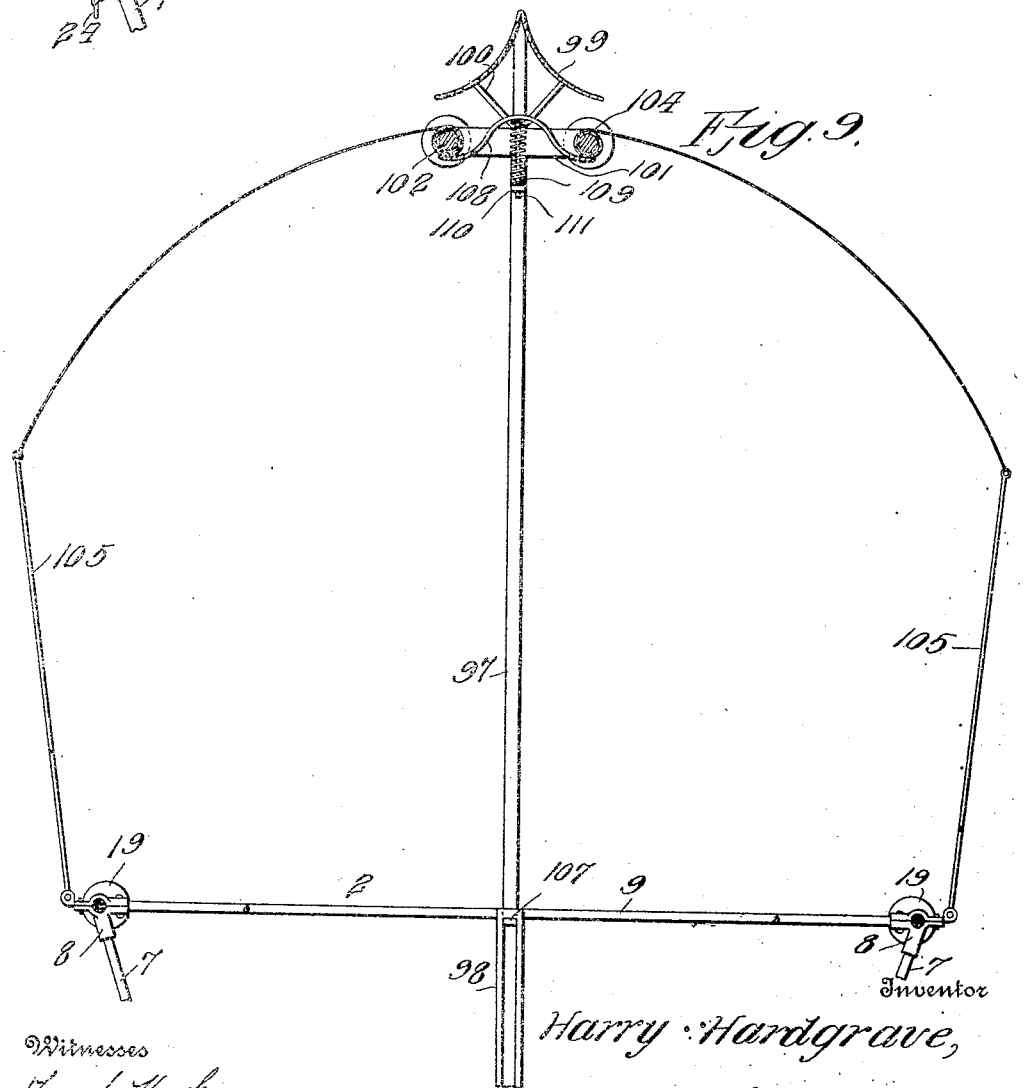

UNITED STATES PATENT OFFICE.

HARRY HARDGRAVE, OF DALHART, TEXAS.

FLYING-MACHINE.

1,039,679.

Specification of Letters Patent. Patented Sept. 24, 1912.

Application filed November 17, 1910. Serial No. 592,873.

*To all whom it may concern:*

Be it known that I, HARRY HARDGRAVE, a citizen of the United States, residing at Dalhart, in the county of Dallam and State of Texas, have invented new and useful Improvements in Flying-Machines, of which the following is a specification.

This invention relates to flying machines of the heavier-than-air class, and one of its objects is to provide a machine wherein rotary beating wings are employed to sustain the machine, the blades of which wings are automatically feathered for a maximum resistance and beating effect on the working portion of their orbit of movement and adjusted to a non-resisting position on the return portion of their movement, the arrangement of the blades being such as to secure a constant sustaining action.

A further object of the invention is to provide a novel construction of wings and feathering mechanism whereby the blades of the wings are opened and closed at proper intervals, and a novel construction of propelling mechanism embodying propellers operative to increase the pressure of air against the beating wings, whereby their sustaining action will be promoted to a material degree.

A still further object of the invention is to provide propelling devices and means under control of the aviator for adjusting the same to drive the machine forwardly or backwardly, to steer the machine vertically and laterally, and to lift the machine and regulate its descent.

A still further object of the invention is to provide automatic means, in the nature of a parachutic appliance, for sustaining the machine and causing its gradual and safe descent to the ground in the event of damage to the normal sustaining portions of the machine.

With these and other objects in view, the invention consists of the features of construction, combination and arrangement of parts, hereinafter fully described and claimed, reference being had to the accompanying drawings, in which:—

Figure 1 is a front elevation of a flying machine constructed in accordance with my invention. Fig. 2 is a top plan view of the same. Fig. 3 is a side elevation. Fig. 4 is a vertical longitudinal section. Fig. 5 is a vertical transverse section. Fig. 6 is a detail view of one of the propellers. Fig. 7 is a detail view, showing a portion of one of the beater wings and the cam mechanism for feathering the same. Fig. 8 is a detail view of the means for adjusting and controlling the propellers. Fig. 9 is a view, partially in section, showing the parachute device opened for operation.

The main frame of the machine may be of any suitable general construction, but preferably embodies a base portion or car 1 to support the engines, main drive gearing, passengers and other parts of the load weight, and a superstructure 2 which carries the main sustaining and propelling devices of the machine. As shown, the car or base portion of the frame comprises upper and lower sets of parallel longitudinal bars 3, cross bars 4 connecting the front and rear ends of the respective sets of bars 3, and suitable intermediate cross pieces 5, the upper and lower sets of bars being connected and reinforced by any desired construction and arrangement of braces 6.

The base frame portion 1 also includes a pair of bars 7 arranged at each end (*i. e.*, at the front and rear) of the machine and connected with the bars 3 and 4, said bars 7 extending upwardly in divergent relation and forming portions of the superstructure 2, said bars being secured at their upper ends to bracket members 8 to which are also secured front and rear cross bars 9, the brackets 8 at each side of the frame having bearings for a pair of longitudinally extending parallel hollow shafts 10 which couple the front and rear frame bars of the superstructure together and thus complete the formation of said superstructure. In addition, the main frame embodies other features of construction employed for connecting and supporting operative parts of the machine, as will be hereinafter fully described. The shafts 10 inclose internal shafts 11 which have bearing therein and in the brackets 8 and support and transmit motion to the driving propellers upon the superstructure.

Arranged on each side of the longitudinal center of the machine is a lifting and sustaining wing, said wings being mounted upon the shafts 10 to rotate in an inward direction, although they may be mounted to rotate in an outward direction. Each wing consists of an annular series of equidistantly arranged radial blades 13, each blade embodying frame arms 14 fixed to the shaft and carrying a series of vanes 15, said vanes being mounted upon shafts 16 journaled in the frame arms 14 and provided at their ends with cranks 17, the cranks at each end of the wing being connected by a link rod 18. Mounted upon each bracket 8 is a stationary cam or eccentric 19 having a cam groove 20 therein receiving a roller 21 mounted upon a reciprocating cross head or member 22 movable in suitable guides 23, said cross head being operatively coupled to the link rod by a connecting rod 24, so that in the revolution of the wings the vanes of the blades thereof will be feathered automatically.

The vanes 13 are concavo-convexly curved in transverse section so that when closed they will impart a corresponding curvature to the blade, the arrangement being such that the concaved sides of the blades face downwardly on the working stroke of said blades to gather and confine the air for a proper sustaining compression and to cause the dynamical reaction of the air on the surfaces of the wing to support the machine in an effective manner. The shape and arrangement of the cam grooves is such as to cause the opening of the vanes to their full open position as the blades move outward and upward on their return stroke and a gradual closing of the vanes as they near the beginning of their working stroke, so that on the inward and downward motion of each blade in turn the vanes will be closed for beating and sustaining effect, while upon the return stroke of the blade the vanes will move edgewise to decrease their resistance to rotation on such movement.

In practice, the beating and sustaining wings are rotated inwardly in order to retain and secure the supporting effect of the body or volume of air which would be displaced by centrifugal force if the wings were revolved in the opposite or an outward direction, whereby a more efficient buoying action is secured at the expenditure of less power and at a lower speed of rotation of the wings, as will be readily understood. The wings are employed for sustaining the machine in the air, for lifting the same in starting a flight, and for regulating and controlling the speed of descent, the driving propellers, hereinbefore referred to and hereinafter described, being employed to drive the machine backwardly or forwardly and to steer the machine vertically and laterally, as well as to assist in lifting the machine and to supply currents of air which are forced against the surfaces of the wings to augment their lifting effect. By this construction and mode of operation of the wings their efficiency of action is materially increased over wings of ordinary construction. As hereinbefore described, the wings may be constructed and mounted to rotate in an outward direction, and, hence, the invention is not limited in this particular.

The driving propellers are arranged and mounted similarly at the front and rear of the machine, each end of the machine being provided with a pair of upper propellers 25 and 26 and a lower propeller 27. The propellers 25 and 26 are mounted on shafts 28 which have a universal joint connection, as at 29, with the extended ends of the shafts 11, while each propeller 27 is mounted on a shaft 30 having a universal joint connection, as at 31, with the adjacent end of a longitudinal extending shaft 32, the propellers 25 and 26 thus being arranged in line with the axes of the sustaining wings and the propellers 27 on a line below and between the same. As a result of this construction and arrangement of the driving propellers the air displaced thereby will strike against the surfaces of the sustaining wings and increase the sustaining action of said wings. Each propeller consists of a series of blades 33 provided at their inner ends with eccentric stems 34 journaled for oscillation in bearing openings in a hub 35 and provided within said hub with crank arms 36. The hub consists of a ring having front and rear closure plates 37, and through notches or recesses in one of said plates extend links or connecting rods 38 attached to a sliding operating sleeve 39 feathered on the propeller shaft, said sleeve being formed with an annular groove 40 receiving a shifting ring or collar 41 to which is connected a yoke 42 having an outwardly extending arm 43. By this construction it will be apparent that the propeller including the sliding sleeve 39 may revolve independently of the ring 41, but that through the medium of said ring and the yoke 42 the collar 39 may be shifted to turn the propeller blades 33 to different positions on their axes to reverse the blades for a backward propelling action or to set said blades to vary their working angle and to consequently vary the propeller thrust.

On each propeller shaft is mounted a sleeve 44 and the sleeves of the shafts 28 of the propellers 25 and 26 are coupled by a connecting rod or link 45, and similar rods or links 46 connect the sleeves of said shaft 28 with the sleeve on the shaft 30 of the lower propeller 27, with which last-named sleeve is also connected an operating rod 47, the propellers thus being coupled to swing vertically and laterally in unison. Mounted on the cross bar 9 of the superstructure is a rack bar 48 fitted to slide in suitable bearings 49 and provided with forwardly extending arms 50 pivotally connected with the rod or link 45, and mounted on a cross bar 51 of the frame structure is another rack bar 52 fitted to slide in suitable bearings 53 and connected with a sleeve 54 of the shaft 30 of the propeller 27 by rods or links 54. A vertical shaft 55 is journaled on the frame and carries pinions 56 and 57 which mesh with the teeth of the respective rack bars, whereby lateral motion may be imparted to the bars upon the rotation of the shaft. The lower end of the shaft carries a beveled gear 58 meshing with a beveled pinion 59 on the adjacent end of a longitudinally extending adjusting shaft 60, which shaft is connected by intermeshing beveled gears 61 with an operating or controlling shaft 62 carrying a hand wheel 63. By turning the shaft 62 in one direction or the other the propellers at each end of the frame may be simultaneously swung laterally in either direction for lateral steering or balancing of the machine, all of the propellers moving in a common direction, as will be readily understood. The rod 47 is connected at its lower end with an arm 64 connected with a worm toothed segment 65 pivotally mounted to swing vertically on the frame, said segment meshing with a worm pinion 66 on the adjacent end of a longitudinally extending adjusting shaft 67 connected by intermeshing beveled gears 68 with a controlling rod or shaft 69 having a hand wheel 70. By the rotation of this shaft 69 in one direction or the other vertical motion will be communicated to the arm 64 to swing the rod 47 up or down and transmit corresponding motion to all of the propellers through the described link connections, thus enabling the propellers to be adjusted for lifting and vertical steering operations. It will be seen that the connections described are the same at each end of the machine, and that both sets of propellers are controlled for the purposes described through common controlling devices. A bell crank lever 71 is pivotally mounted at each end of the frame and is connected by a rod or link 72 with a crank arm 73 on a rock shaft 74, which shaft is journaled in suitable bearings 75 on the rack bar 48 to swing in a vertical plane and is provided at its end with arms 76 coupled by rods or links 77 to bell crank levers 78 connected with the arms 43 of the yokes 42 of the upper propellers 25 and 26, whereby through a rocking motion of said shaft 74 through the medium of the lever 71 the collars 39 of said propellers may be shifted back and forth to adjust the blades 33 thereof to reversing position for different working angles, as hereinbefore set forth. Levers 79 are mounted on the frame and respectively connected with the bell crank levers 71 by wires or suitable flexible connections 80 by which the propellers at each end of the machine may be independently reversed or adjusted for variable working action.

For the purpose of reversing and adjusting the blades of both lower propellers independently or simultaneously, bell crank levers 81 are mounted on the thrust rods 47 and connected with the yokes 42 of said propellers and with cords or connections 82 leading to operating levers 83, through the operation of which the blades of said propellers may be adjusted in an obvious manner. The controlling devices above described are mounted in a convenient position upon the frame adjacent to the aviator's seat. The beating and sustaining wings and associated propellers are driven from the shaft 84 operated by a motor 85, the front and rear ends of said shaft being provided with sprocket wheels 86 connected by sprocket chains 87 with sprocket wheels 88 on the shafts 10, the front chain constituting a direct drive for propelling the shaft 10 immediately above it in the same direction as the shaft 84, while the rear chain extends diagonally to the rear end of the opposite shaft 10 and is crossed for propelling said shaft in the reverse direction. The beating and sustaining wings and associated propellers are also driven from a shaft 89 operated by an engine 90, which shaft is provided at its front and rear ends with sprocket wheels 91, connected with sprocket wheels 92 on the propeller drive shafts 11 by chains 93, arranged in a similar manner to the driving chains 87. On the shaft 89 is also a sprocket wheel 94 connected with a sprocket wheel 95 on the shaft 32 by a chain 96 whereby the lower propellers 27 are driven.

In order to insure the slow and safe descent of the machine to the ground in the event of accident or derangement of the sustaining devices above described, I provide a safety appliance in the form of a suspension member or parachute which is automatically thrown into operation whenever the machine drops or falls to any appreciable degree. This device comprises a vertically movable frame consisting of front and rear standards 97 vertically slidable in guides 98 on the frame bars 9 and 51, which standards carry and are connected at their upper ends by a longitudinally extending guard or shield 99 arranged in the center line of the machine immediately above the clearance space between the sustaining wings. This guard or shield, which is approximately of inverted V-form in cross section, is reinforced from the frame standards by braces 100 and operated in conjunction with the parachute aprons, hereinafter described, as a deflector to deflect the currents of air flowing inwardly and upwardly from the beater wings in an outward direction and prevent down drafts or currents of air between the acting blades of the wings through the suction produced thereby, thus preventing the depressing action of currents of air from above. The standards support cross pieces 101 which are provided with bearings for winding shafts 102, and which cross pieces form housings for coiled motor springs 103, each secured at one end to the cross piece and at its opposite end to the associated winding shaft. Wound about each shaft is a roll 104 formed by an apron of canvas or other suitable material, one end of which is suitably fastened to the shaft, the free ends or edges of the respective aprons being connected to the upper free ends of spreaders or connecting devices 105, consisting of rods pivotally fastened for lateral swinging movement upon the brackets 8 of the main frame. The guard or shield 99 overhangs the rolls and the spreader rods 105 are normally drawn inwardly and the aprons held rolled up by the springs 103.

If, from any cause, the machine should drop to any appreciable extent from the failure of the sustaining mechanism to support it in the air, the pressure of the air against the aprons and shield will cause the safety appliance as a whole to slide upwardly, until the motion thereof is limited by stops 107 on the standards coming into engagement with the guides. As a result of this relative upward movement of the safety appliance, the aprons will be unwound and extended outwardly to form a bow-shaped canopy or parachute, as illustrated in Fig. 9, thus arresting the speed of descent of the machine and causing it to descend slowly and safely to the ground. A pressure device 108 is provided to bear against the underside of the rolls 104 to hold the folds of the latter at all times taut, which device is supported by spring-pressed rods 109 movable in guides 110 on the frame standard and limited in upward movement by stops 111.

From the foregoing description, taken in connection with the accompanying drawings, the construction and mode of operation of my improved flying machine will be readily understood, and it will be seen that it provides sustaining and propelling devices which are effective in use and at all times under the control of the operator, and a safety device which insures the slow descent of the machine in the event of the failure of the sustentation means.

While the construction shown and described is preferred, it will, of course, be understood that many modifications within the scope of the invention, as defined in the appended claims, may be made without departing from the spirit or sacrificing any of the advantages of the invention.

Having thus described my invention, I claim:—

1. A flying machine including a frame provided with bearings, hollow shafts journaled in said bearings on opposite sides of the longitudinal center of the frame, beating and sustaining wings mounted upon said hollow shafts, each wing comprising a series of blades having feathering vanes, other shafts extending through said hollow shafts, driving propellers mounted thereon, means for transmitting motion to said shafts, means for feathering the vanes of the blades, and means for adjusting said propellers at different angles with relation to the wings.

2. A flying machine embodying a frame, longitudinal shafts at opposite sides of the longitudinal center of the frame, rotating beating and sustaining wings mounted on said shafts, propeller shafts universally jointed to said longitudinal shafts, a vertically swinging and laterally slidable bracket supported by the frame, means for swinging and sliding said bracket, propellers mounted on the propeller shafts, and connections between the bracket and propeller shafts for adjusting said shafts in unison with each other and with said bracket.

3. A flying machine embodying a frame, upper propeller shafts arranged on opposite sides of the longitudinal center of the frame and universally mounted to swing vertically and laterally, a lower propeller shaft arranged in line with the longitudinal center of the frame and correspondingly mounted, propellers mounted upon said shafts, pivotal connections between the upper and lower propeller shafts, means connected with the lower series of propellers vertically through said connections, a vertically swinging and laterally sliding bracket connected with the upper propellers, and means for sliding said bracket to swing the propellers laterally.

4. A flying machine embodying a frame, longitudinal shafts at opposite sides of the longitudinal center of the frame, a laterally sliding and vertically tilting bracket, propeller shafts universally jointed to said longitudinal shafts, propellers mounted on said shafts and having adjustable blades and means, including sliding sleeves, for adjusting said blades, a rod supported by the bracket and coupling the propeller shafts for movement in unison, devices for vertically tilting the bracket and propellers and sliding the bracket to swing the propellers laterally, a rock shaft supported by the bracket, means for actuating the same, and rod and crank connections between said rock shaft and the said sleeves for shifting the sleeves to adjust the propeller blades.

5. A flying machine embodying a frame, longitudinally extending shafts at opposite sides of the longitudinal center of the frame, front and rear propeller shafts universally jointed to the front and rear ends of said longitudinal shafts, front and rear propellers mounted upon the respective propeller shafts, devices at the front and rear ends of the frame for vertically tilting or laterally swinging the adjacent propellers in unison, and means for simultaneously transmitting motion to said sets of devices for adjusting the front and rear propellers in unison in a common direction.

6. A flying machine embodying a frame, upper longitudinal shafts at opposite sides of the frame, a lower central longitudinal shaft, propeller shafts universally jointed to said upper and lower longitudinal shafts, coupling connections between the upper propeller shafts and the lower propeller shafts, a coupling connection between the upper propeller shafts, means connected with the lower propeller shaft for tilting all three shafts vertically and means associated with the coupling connection between the upper shafts for shifting all three propellers laterally.

7. A flying machine embodying a frame, upper longitudinal shafts at opposite sides of the frame, a lower central longitudinal shaft, propeller shafts universally jointed to said longitudinal shafts, propellers carried by said propeller shafts, a coupling connection between the upper propeller shafts, a laterally sliding and vertically tilting bracket supporting the lower central propeller shaft, coupling connections between the upper propeller shafts and the lower propeller shafts, means connected with the lower propeller shaft for vertically tilting the brackets and propeller shafts, and operating means for simultaneously sliding the brackets in either direction laterally.

8. A flying machine embodying a frame, a pair of upper propellers arranged at opposite sides of the frame, a lower propeller disposed in a vertical plane intermediate said upper propellers, each of said propellers being universally mounted and provided with adjustable blades, means for tilting all three propellers vertically in unison, means for swinging all three propellers laterally in unison, and means for simultaneously adjusting the blades of all three propellers to like degrees in unison.

9. A flying machine comprising a main frame, a vertically movable frame mounted thereon, winding drums mounted on the latter-named frame, aprons wound upon said drums, and means movably connecting the free edges of the aprons with the main frame.

10. A flying machine including a main frame provided with sustaining and propelling means, a vertically movable frame slidably mounted on said main frame, spring actuated swinging shafts journaled on the vertically movable frame, aprons wound upon the shafts, connections between the free edges of the aprons and the main frame, and a spring actuated pressure device bearing upon the wound portions of the aprons.

11. A flying machine including a main frame provided with sustaining and propelling means, a vertically movable frame slidably mounted on said main frame, spring-actuated winding shafts journaled on the vertically movable frame, aprons wound upon the shafts, and connections between the free edges of the aprons and the main frame.

12. A flying machine comprising a main frame provided with sustaining and propelling means, a vertically movable frame slidably mounted on said main frame, spring-actuated winding shafts journaled on the vertically movable frame, aprons wound upon the shafts, a guard or shield arranged above said shafts and aprons, and connections between the free edges of the aprons and the main frame.

In testimony whereof I affix my signature in presence of two witnesses.

HARRY HARDGRAVE.

Witnesses:
 DURELL MILLER,
 W. J. LACY.